United States Patent [19]

McAuliffe, Jr.

[11] Patent Number: 4,998,559

[45] Date of Patent: Mar. 12, 1991

[54] SOLENOID OPERATED PRESSURE CONTROL VALVE

[75] Inventor: Lawrence McAuliffe, Jr., Southfield, Mich.

[73] Assignee: Coltec Industries Inc., New York, N.Y.

[21] Appl. No.: 471,709

[22] Filed: Jan. 29, 1990

Related U.S. Application Data

[62] Division of Ser. No. 243,679, Sep. 13, 1988, abandoned.

[51] Int. Cl.$^5$ ............................................. F15B 13/044
[52] U.S. Cl. .......................... 137/596.17; 137/625.65; 251/129.14; 251/129.21
[58] Field of Search ...................... 137/625.65, 596.17, 137/870; 251/129.02, 129.18, 129.21, 129.14

[56] References Cited

U.S. PATENT DOCUMENTS

| | | | |
|---|---|---|---|
| 2,267,515 | 12/1944 | Wilcox et al. | 137/625.65 |
| 2,868,494 | 1/1959 | Kearns et al. | 251/129.14 X |
| 3,307,585 | 3/1967 | Schilling et al. | 137/625.27 X |
| 3,498,330 | 3/1970 | Paige | 251/129.21 X |
| 3,529,620 | 9/1970 | Leiber | 281/129.18 X |
| 3,651,833 | 3/1972 | Piko | 137/625.65 |
| 3,828,818 | 8/1974 | Hunt | 137/625.65 |
| 4,312,380 | 1/1982 | Leiber et al. | 137/625.65 X |
| 4,320,781 | 3/1982 | Bouvet et al. | 137/625.65 |
| 4,338,966 | 7/1982 | Smith | 137/625.65 X |
| 4,391,292 | 7/1983 | Millar | 137/596.17 X |
| 4,556,085 | 12/1985 | Warrick | 137/625.65 |
| 4,578,662 | 3/1986 | Slavin et al. | 137/625.65 X |
| 4,610,267 | 9/1986 | Beck et al. | 137/596.17 |
| 4,718,454 | 1/1988 | Appleby | 137/625.65 X |

FOREIGN PATENT DOCUMENTS

| | | | |
|---|---|---|---|
| 1157871 | 11/1963 | Fed. Rep. of Germany | 137/625.65 |
| 543767 | 5/1956 | Italy | 137/596.17 |
| 294989 | 4/1971 | U.S.S.R. | 137/625.65 |
| 316075 | 11/1971 | U.S.S.R. | 137/625.65 |
| 469852 | 8/1975 | U.S.S.R. | 137/596.17 |

*Primary Examiner*—Gerald A. Michalsky
*Attorney, Agent, or Firm*—Howard S. Reiter

[57] ABSTRACT

A solenoid actuated pressure control valve includes a solenoid coil having a central passage extending axially through the coil. An armature is movable axially within the coil passage to be magnetically attracted to the pole piece when the coil is energized. Fluid pressure at a supply port of the valve biases the armature to its opposite end limit of movement when the coil is deenergized. Various forms of valving arrangements are disclosed, in one of which valve heads are located on the opposite ends of the armature to engage either of opposed valve seats dependent on whether the coil is energized or not. In other arrangements, the armature engages a push rod to unseat one valve upon energization of the coil while closing a seond valve. The one valve is biased to its closed position by supply port pressure when the coil is deenergized, the push rod opening the other valve. The valves operate to connect a control port to a sump port when the coil is deenergized and to connect the control port to the supply port upon energization of the coil. One form of valve employs a diaphragm to hydraulically isolate the coil, pole piece and armature from the controlled fluid.

2 Claims, 3 Drawing Sheets

SOLENOID OPERATED PRESSURE CONTROL VALVE

This application is division of application Ser. No. 07/243,679 filed on Sept. 13, 1988, now abandoned.

BACKGROUND OF THE INVENTION

I. Field of the Invention

The present invention relates to solenoid operated pressure control valves employed in applications where the valve will accurately vary the pressure at a control port in accordance with variations in an electrical control signal, which may be derived from a computer, which varies the on-off time of energization of the solenoid.

II. Description of the Related Art

While there are many applications for such a valve, one application which has been of interest in recent years is that of the control of an automatic transmision for a motor vehicle by independently regulating the engagement pressure applied to each of the various clutches in the transmission. The torque transmitted by a given clutch may be varied by varying the pressure of engagement between the opposed clutch plates. Presently available electronic control units can rapidly and precisely generate the desired electrical output signals in response to sensed vehicle operating conditions. However, converting these electrical control signals into a precisely proportional fluid pressure which will accurately track variations in the electrical control signal has posed problems.

In such a system, a solenoid actuated valve is a logical choice as the interface between the electrical and hydraulic portions of the system. See, for example, U.S. Pat. No. 4,579,145 which describes a solenoid actuated valve for such an application. A system employing a valve of the type shown in that patent is described in some detail in SAE Technical Paper 840448.

As in U.S. Pat. No. 4,579,145 the solenoid actuated valve may be designed to regulate the pressure at a control port by cyclically connecting the control port alternately to a source of fluid under pressure and to a fluid sump, these alternate connections being made in accordance with the energization or deenergization of the solenoid coil. An electronic processor may be employed to regulate the time during each cycle the coil is energized ("on time"), the coil being deenergized for the remainder of the cycle ("off time"), this type of regualtion being commonly referred to as pulse width modulation. A typical operating pulse frequency might be 60 Hz. In steady state operation the pressure at the control port will be that percentage of the fluid source pressure which is equal to that precentage of time which the control port is connected to the fluid source, sump pressure being assumed to be zero.

In order to enable the control port pressure to be varied in a true linear relationship to variations in "on time" of the solenoid coil, the valve member which controls the fluid connection of the control port to pressure supply or sump must be capable of rapid shifting movement in close synchronism with the energization and deenergization of the coil. Further, the valve member should also be movable in response to a relatively small magnetic force in order to minimize the size and power requirements of the solenoid.

Conventionally, in solenoid actuated valves of this general type, a return spring is employed to bias the movable valve member to its solenoid deenergized position. The coil springs so employed pose handling problems in assembling the valve in that when they are supplied in bulk, the individual springs become entangled with each other and must be manually untangled. Good design practice dictates the usage of a minimum number of energy sources and the hydraulic and electrical energy sources should be sufficient.

The present invention is especially directed to a solenoid valve having these last characteristics.

SUMMARY OF THE INVENTION

Three forms of solenoid actuated valves embodying the present invention are disclosed. These valves have the common feature of a moveable valve member which is biased to one of its operating positions by the fluid pressure applied to the supply port of the valve. The valve member is moved to its alternative position by energization of the solenoid coil. Each of the valves includes two internal valve seats which are engageable by associated valve heads movable with the valve member to control fluid communication between the supply port, a control port at which the pressure is to be controlled, and a sump or exhaust port connected to a fluid sump. In one position of the valve member, the control port is connectd through one of the valve seats to the supply port while the other valve seat is engaged by its valve head to block internal communication to the sump port. In the other position of the valve, the control port communicates through the other valve seat with the sump port, while the first valve seat is engaged by its associated valve head to seal off communication with the supply port.

In each of the three valves, the solenoid includes a pole piece which is directly engaged by the movable valve member when the solenoid is energized. In two of the three forms of valves, a fluid flow passage extends through the pole piece to open through a valve seat at that end of the pole piece engaged by the valve member upon energization of the solenoid coil. The engaged end of the valve member thus functions as one of the valve heads. In the other form of valve, a diaphragm is employed to isolate the solenoid from the hydraulic fluid which, particularly in automatic transmission application, may become contaminated during usage by metal particles which would become magnetized and collect in those portions of the system transversed by the magnetic flux of the solenoid.

Other objects and features of the invention will become apparent by reference to the following specification and to the drawings.

DESCRIPTION OF THE PREFERRED EMBODIMENTS

Figure 1:
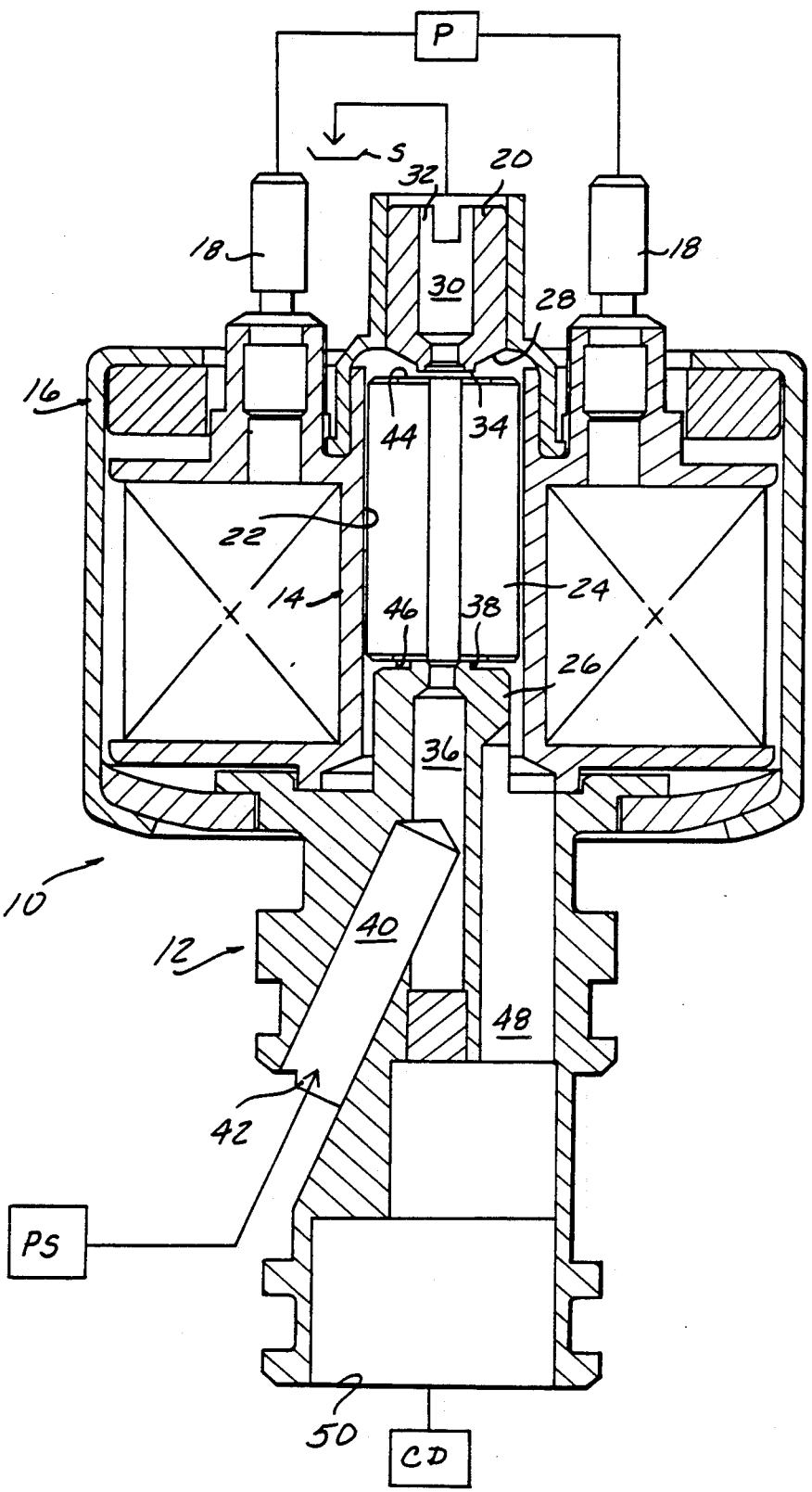
FIG. 1 is a cross-sectional view, taken in an axial plane, of one form of solenoid valve embodying the present invention.

Referring first to FIG. 1, one form of valve embodying the present invention includes a valve housing designated generally 10 having a lower housing member designated generally 12 which is formed of steel or some other ferromagnetic material. A solenoid coil and bobbin assembly designated generally 14 is mounted at the top of lower housing member 12, which functions as a pole piece of the solenoid, and fixedly retained in a coaxial assembled relationship with member 12 by a suitable solenoid case assembly designated generally 16. Externally accessible electrical terminals 18 project upwardly from the solenoid assembly 14 to provide electrical connections to the coil of the solenoid. An upper housing member 20 is mounted coaxially upon the upper end of the bobbin of solenoid 14 to provide a fluid-tight enclosure at the upper end of a central passage 22 through the bobbin of the solenoid. All of the parts described thus far are fixedly and, where appropriate, sealingly secured to each other in the assembled valve.

The only movable part of the valve of FIG. 1 is a movable valve member 24 which also constitutes the armature of the solenoid. Valve member 24 is constructed of steel or some other ferromagnetic material and is loosely received within the central passage 22 through the solenoid for axial movement between the upper end or pole piece portion 26 of lower housing member 12 and the lower end 28 of the upper housing member 20.

A fluid flow passage 30 extends coaxially through upper housing member 20 from an externally accessible port which will be identified as a sump port 32 to open into passage 22 through an annualr valve seat 34 formed on the lower end of upper housing member 20. A second passage 36 in lower housing member 12 opens upwardly into passage 22 through a second annular valve seat 38 at the upper end of lower housing member 12. Passage 36 communicates directly with an angled passage 40 which opens at the exterior of lower housing member 12 through a port which will be identified as a supply port 42.

The upper and lower ends 44 and 46 of valve member 24 function as valve heads respectively engageable with valve seats 34 and 38 and operable when so engaged to seal passage 30 or 36 from passage 22. The axial length of valve member 24 is less than the distance between the two valve seats 34, 38, and hence valve member 24 can seal only one of the two valve seats at any given time.

Passage 22 communicates at all times with a third passage 48 which extends downwardly through lower housing member 12 to open at the lower end of member 12 at what will be identified as a control port 50.

As previously stated, lower housing member 12 is formed of a ferromagnetic material and the upper end 26 of member 12 which projects into passage 22 functions as a pole piece of the solenoid coil. When the solenoid coil is energized, the ferromagnetic valve member 24 is magnetically attracted to the position shown in FIG. 1 to cause the valve seat 46 of valve member 24 to seat upon valve seat 38, thus closing the upper end of passage 36.

In FIG. 1, hydraulic and electrical connections to the valve have been schematically indicated. These include a pressure supply source indicated schematically at PS which is operabe to supply fluid under pressure to supply port 42, a controlled device schematically indicated at CD to which fluid at a selected or regulated pressure is to be supplied via port 50, and a fluid sump schematically illustrated at S which is connected to sump port 32. An electronic processor-controlled power source indicated at P is connected to connectors 18 to electrically energize the coil of solenoid assembly 14 in cyclic pulses, the time duration of the individual energization pulses being varied in accordance with inputs monitored by the electronic processor in a well-known manner to provide a pulse width modulated control signal.

When the coil of solenoid 14 is deenergized, fluid pressure suplied from pressure souce PS exists in passage 36, and this pressure will bias valve member 24 upwardly from the FIG. 1 position to engage its upper valve head 44 with valve seat 34 to block communication between passage 22 and passage 30. When so seated, the entire lower surface of valve member 24 is exposed to the high pressure from pressure source PS, while a portion of the upper surface of valve member 24 is exposed only to the low pressure (typically atmospheric) pressure which exists at sump S. At this time, passage 36 opens into passage 22 which in turn directly communicates with passage 48 which in turn communicates with the controlled device CD through control port 50.

When solenoid 14 is energized, valve member 24 is magnetically attracted downwardly into engagement with valve seat 38 on pole piece 26, thus blocking communication between passage 22 and the pressure supply source PS. At the same time, valve head 44 of the valve member is disengaged from its valve seat 36, thus placing sump S in communication with controlled device CD via passages 30, 22 and 48.

When the solenoid is energized, the controlled device is thus connected to sump S and hydraulically isolated from pressure supply PS. When the solenoid is deenergized, the controlled device CD is connected to the pressure source sand hydraulically isolated form sump S. The pressure developed at the controlled device will be a fraction of the pressure supplied from source PS equal to the percentage of time duirng which the controlled device is hydraulically connected to source PS (sump pressure is assumed to be zero).

Figure 2:
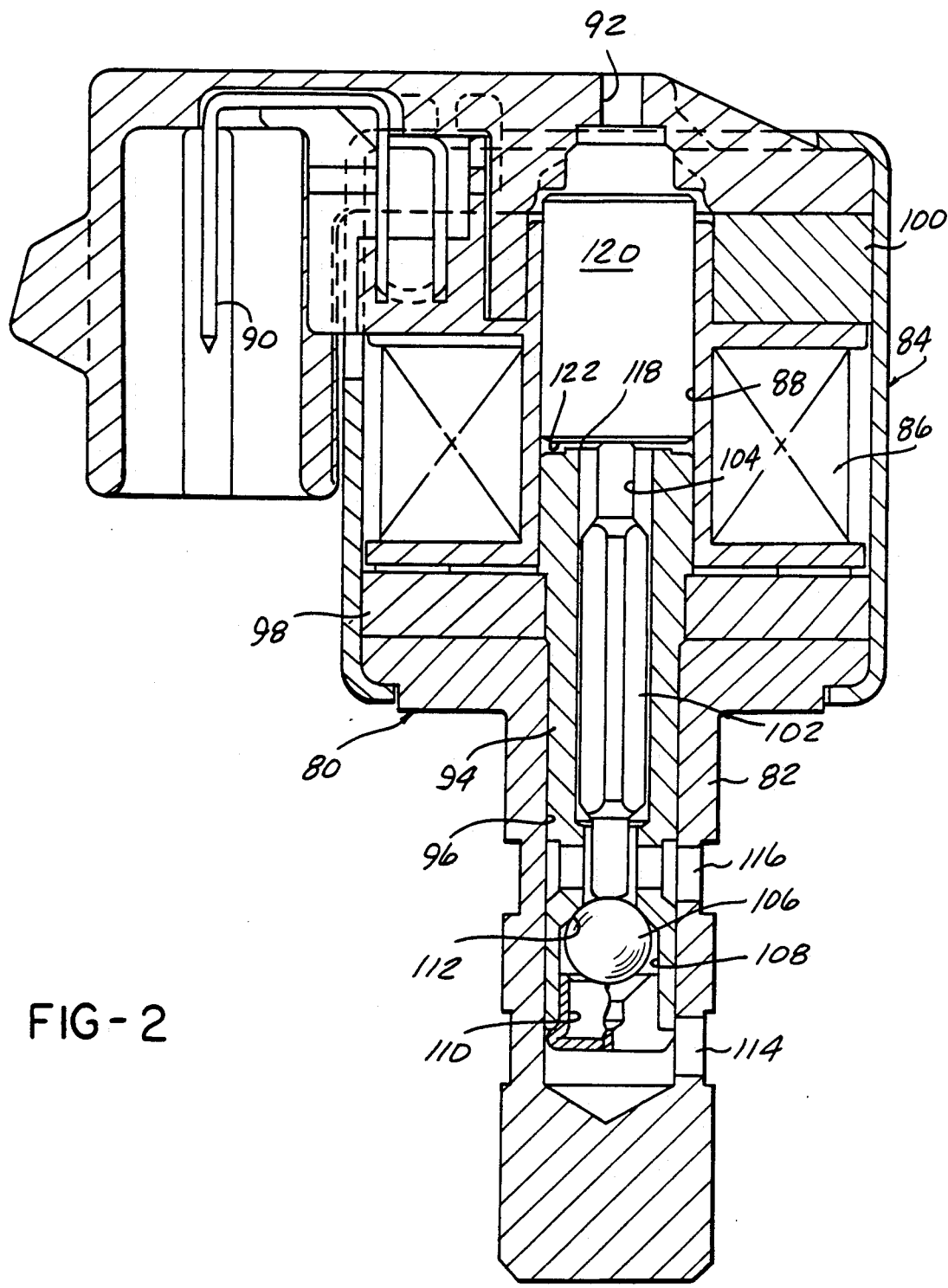
FIG. 2 is a cross-sectional view, taken in an axial plane, of a second form of valve embodying the present invention.

A modified form of valve is shown in FIG. 2.

The valve of FIG. 2 includes a housing designated generally 80 having a lower housing portion 82 and an upper housing portion 84 within which is mounted a solenoid coil assembly designated generally 86 and having a central passage 88 extending coaxially through the assembly. Electrical connectors, such as 90, are located in the upper portion of the housing to provide externally accessable electrical connections to the solenoid coil, and a sump port 92 in the top of upper housing portion 84 opens at its lower end into fluid communication with central passage 88.

A tubular valve body 94 and has its upper end located within the lower portion of passage 88 and extends downwardly into a bore 96 in lower housing portion 82. In the valve of FIG. 2, valve body 94 is made of a ferromagnetic material so it may function as a pole piece, but it is not necessary that the lower valve housing member 82 be of ferromagnetic material. Flux washers 98 and 100 above and below the coil of solenoid 86 serve to guide the magnetic circuit. Valve body 94 functions as a pole piece of the solenoid.

A push rod 102 is slidably received within the upper portion of a bore 104 extending axially through valve body 94. Push rod 102 is fluted so that fluid may freely flow through passage 104 past the push rod.

A valve ball 106 is loosely received within an enlarged diameter section 108 at the lower end of passage 104 and is loosely retained within the enlarged diameter passage 108 as by a retainer 110 press fitted into the lower end of section 108 of the passage. The upper end of enlarged diameter section 108 terminates at a downwardly facing conical surface which defines a valve seat 112. Retainer 110 accommodates movement of ball 106 downwardly to a position spaced below seat 112 to place a supply port 114 in fluid communication with the upper portion of passage 104 via valve seat 112. Pressure supplied to port 114 normally will bias ball 106 upwardly into engagement with valve seat 112 to block communication between supply port 114 and the upper portion of bore 104. A control port 116 in lower housing portion 82 opens into bore 104 above valve seat 112. At the upper end of bore 104, an annular valve seat 118 is formed at the upper end of valve body 94.

A solenoid armature 120 is loosely mounted in passage 88 for limited axial movement. The fit of armature 120 within passage 88 is loose enough to permit a substantially unrestricted flow of fluid through passage 88 past the armature. If necessary, vertical grooves in the outer surface of the armature may be formed to increase the cross-sectional area of the flow passage. The lower end of armature 120 constitutes a valve head 122 engageable with valve seat 118 or pole piece 94 to block fluid communication between bore 104 and passage 88.

The hydraulic and electrical connections to the valve of FIG. 2 may be the same as those described above to the valve of FIG. 1. A pressure supply source PS is connected to supply port 114, a controlled device CD is connected to control port 116 and port 92 is connected to sump S. With these hydraulic connections and the coil of solenoid 86 deenergized, fluid pressure at port 114 will bias valve ball 106 upwardly into engagement with valve seat 112 to hydraulically isolate supply port 114 from bore 104, control port 116, passage 88 and sump 92. When ball 106 is so seated on seat 108, it elevates push rod 102 to the position shown in FIG. 2 in which armature 120 is elevated by push rod 102 upwardly clear of valve seat 118. In this position of the parts, control port 116 is connectd to sump port 92 via bore 104, valve seat 118 and passage 88.

Upon energization of the coil of solenoid 86, armature 120 is magnetically attracted downwardly into engagement with the upper end of valve body 94, which constitutes the pole piece of the solenoid. This downward movement of armature 120 engages valve head 122 of the armature with valve seat 118 to block communication between passage 88 and bore 104, thus hydraulically isolating the control port 116 from sump port 92.

This downward movement of armature 120 in turn is transmitted via push rod 102 to ball 106 to force ball 106 downwardly away from its seat 112, thereby placing supply port 114 in communication with control port 116 via valve seat 112.

As was the case with the valve of FIG. 1, the solenoid coil of the valve of FIG. 2 is energized by a pulse-width modulation control system and the alternating connection of control port 116 to supply port 114 and sump port 92 regulates the pressure at control port 116 in accordance with the percentage of time duirng which control port 116 is connected to supply port 114.

Figure 3:
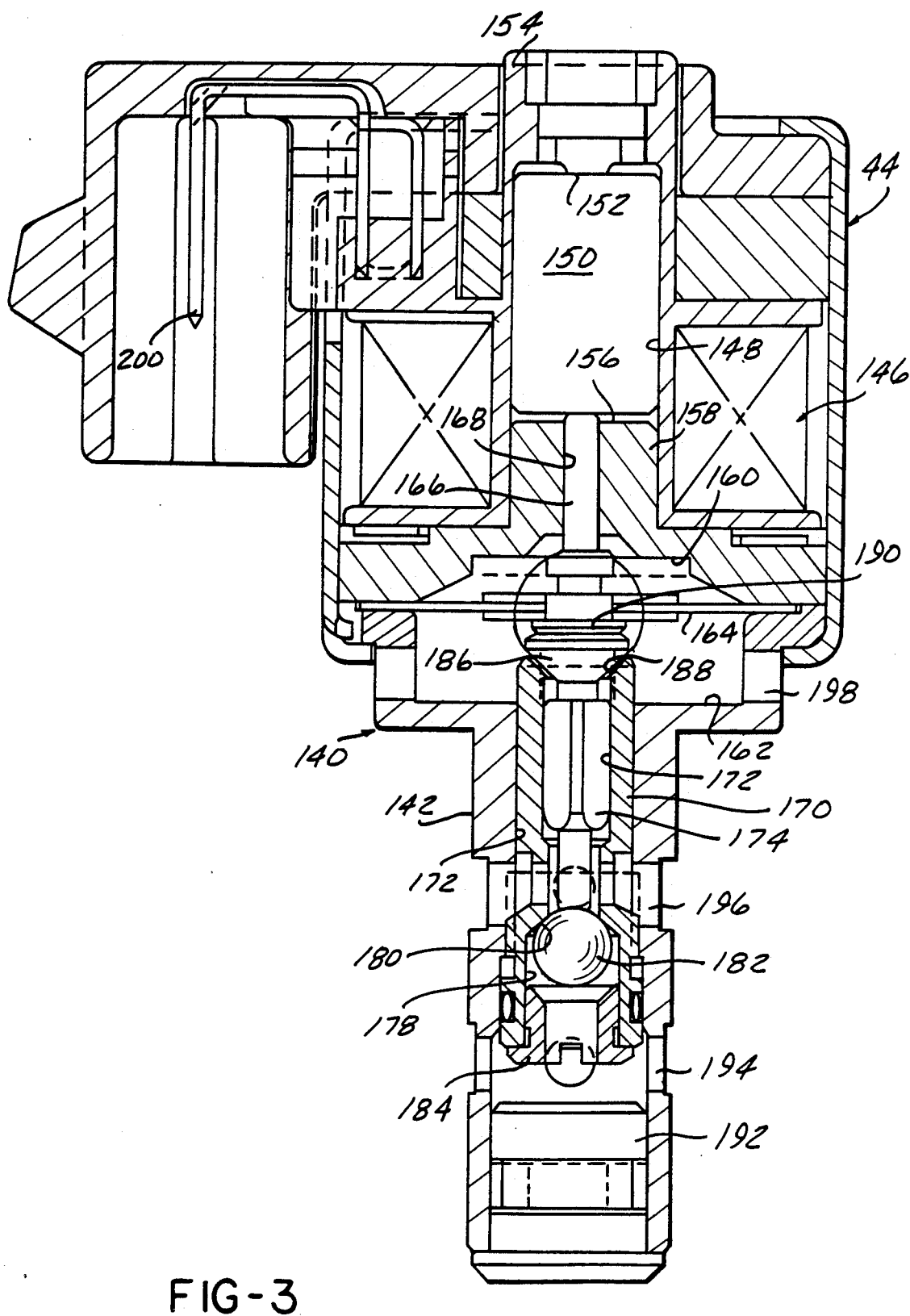
FIG. 3 is a cross-sectional view, taken in an axial plane, of a third form of valve embodying the present invention.

A third form of valve embodying the present invention is shown in FIG. 3. In many respects, the valve of FIG. 3 is closely similar to the valve of FIG. 2. The primary distinction between the valve of FIG. 3 and the valve of FIG. 2 is that the valve of FIG. 3 employs a diaphragm 164 which hydraulically isolates the solenoid coil asembly, armature and pole piece from the flow path of the working hydraulic fluid through the valve. In certain applications, such as the control of an automatic transmission, the fluid which flows through the valve may also be employed to lubricate, drive or cool the mechanical parts of the control system. In these applications, wearing of the parts will introduce tiny metal particles into the fluid and these metal particles may be magnetically attracted to and tend to collect in those portions of the hydraulic circuit exposed to the magnetic field of the solenoid coil. By hydraulically isolating the fluid from those parts of the valve in which the magnetic flux is most highly concentrated, attraction and collection of these particles about the armature is minimized.

The valve of FIG. 3 includes a housing designated generally 140. A lower housing member 142 is fixedly secured at its upper end to an upper housing assembly designated generally 144 within which is mounted a solenoid coil assembly designated generaly 146 having an axially extending central passage 148. An armature 150 is slidably received within passage 148 form movement axially within passage 148 between opposite end limits of movement established by the engagement of the upper end of armatue 150 with the lower end 152 of a cap portion 154 on the bobbin of solenoid assembly 146 or by the engagement of the lower end of armature 150 with the upper end 156 of a pole piece 158 which projects into the lower end of passage 148.

The bottom of pole piece 158 is recessed as at 160 and the upper end of lower housing member 142 is recessed at 162. Recesses 160 and 162 provide operating clearance for a flexible diaphragm 164 which is sealingly clamped around its periphery between the under surface of pole piece 158 and the upper surface of lower housing member 142. A diaphragm stem 166 is fixedly secured to the central portion of diaphragm 164 and projects upwardly from the diaphragm to be slidably received within a vertical bore extending between the upper side of recess 160 and the upper surface 156 of pole piece 158. Diaphragm stem 166, as shown in FIG. 3, normally projects upwardly from pole piece 158 and is engaged with the lower end of armature 150.

As will be described in greater detail below, diaphragm 164 hydraulically isolates the hydraulic fluid which flow through lower housing member 142 from pole piece 158 and solenoid coil assembly 146, the hydraulic fluid being confined by the diaphragm to those portions of the valve assembly located below diaphragm 164 as viewed in FIG. 3.

A valve body 170 is fixdedly mounted within a central bore 172 extending vertically through lower housing member 142. A fluted valve stem 174 is slidably received within the upper portion of a bore 176 extending coaxially through valve body 10. Bore 176 through valve body 170 is formed with an enlarged diameter lower portion 178 having a downwardly facing, conical valve seat 180 at its upper end. A valve ball 182 is loosely retained in the enlarged diameter bore section 178 and is engageable with valve seat 180 to block fluid communication between enlarged diameter bore 178 and that portion of bore 176 above valve seat 180. Retainer 184 accommodates movement of ball 182 downwardly away from seat 180 a sufficient distance to permit fluid to flow from bore 178 upwardly past valve seat 180.

A valve head 186 is fixedly mounted upon the upper end of valve stem 174 for movement into and out of engagement with an annular valve seat 188 through which the upper end of bore 170 opens into recess 162 of the lower housing member. Valve head 186 engages the under side of the diaphragm washer 190 which mounts stem 166 on diaphragm 164.

The enlarged diameter bore section 178 at the lower end of valve body 170 opens through retainer 184 into a chamber 192 in lower housing member 142 which in turn opens through the wall of member 142 via a supply port 194 connected to a pressure source PS. Control ports 196 through the wall of housing portion 142 are connected to an external controlled device CD and open into bore 176 at a location above valve seat 180. Recess 162 at the upper end of lower housing member 142 opens at the exterior of the housing through a control port 198 connected to a fluid sump S.

In use, supply port 194, control port 196 and sump port 198 are respectively hydraulically connected to a source of fluid under pressure, a device to be controlled and a fluid sump as in the previously described embodiments. The coil of solenoid assembly 146 similarly is connected to a processor-controlled, electric power supply via electrical connectors 200 as in the previously described valves.

With the solenoid deenergized, pressure applied at supply port 194 will seat valve ball 182 against its seat 180, hydraulically isolating supply port 194 from control port 196 and sump port 198. When valve ball 182 is engaged with its seat 180, it elevates valve stem 174 upwardly a distance sufficient to elevate valve head 186 at the upper end of stem 174 clear of valve seat 188 so that control port 196 is in communication with sump port 198. Elevation of valve stem 174 to a position where valve head 186 is unseated as just described causes valve head 186 to push upwardly against diaphragm washer 190 to thereby elevate diaphragm stem 166 to the position shown in FIG. 3 in which armature 150 is elevated clear of the upper end 156 of pole piece 158.

Energization of the solenoid coil of solenoid assembly 146 establishes a magnetic field which magnetically attracts armature 150 downwardly into engagement with the upper end 156 of pole piece 158. This downward movement of armature 150 is transmitted via diaphragm stem 166 and valve head 186 to valve stem 174 to drive the stem downwardly to seat valve head 186 against seat 188 at the upper end of bore 176. Seating of valve head 186 against its seat 188 blocks fluid communication between sump port 198 and control port 196. The downward movement of valve stem 174 occasioned by the seating of head 186 against seat 188 forces valve ball 182 downwardly away from its seat 180 to place supply port 194 in communication with control port 196.

While three embodiments of the invention have been disclosed, it will be apparent to those skilled in the art the disclosed embodiments may be modified. Therefore, the foregoing description is to be considered exemplary rather than limiting, and the true scope of the invention is that defined in the following claims.

What is claimed is:

1. A solenoid actuated fluid pressure control valve comprising a housing having a central passage extending vertically downwardly from a first port adapted to be connected to a fluid sump and located at the upper end of said housing to a second port adapted to be connected to a source of fluid pressure and located adjacent the lower end of said housing, a solenoid coil mounted within said housing intermediate the upper and lower ends thereof in coxial relationship with said central passage, an elongate tubular valve body sealingly seated in said central passage with the upper end of said valve body projecting above the lower end of said coil and the lower end of said body located above said second port, a flow passage extending through said valve body from a lower downwardly facing frusto conical valve seat opening into said central passage at the lower end of said body to an upper upwardly facing valve seat at the upper end of said body opening into said central passage at the upper end of said body, means defining a third port in said housing in constant fluid communication with said flow passage at a location between said upper valve seat and said lower valve seat, a ball located in said flow passage between and said lower valve seat and said second port operable when seated against said lower valve seat to block fluid communication between said second port and that portion of said flow passage above said lower valve seat, a solenoid armature received in said central passage between said upper valve seat and said first port and having means at its lower end operable when engaged with said upper valve seat to block fluid communication between said flow passage and that portion of said central passage above said upper valve seat, said armature being adapted to accommodate a substantially unrestricted flow of fluid past said armature through that portion of said central passage between said valve body and said first port, a push rod loosely slidably received in said flow passage having a lower end projecting through said lower valve seat into engagement with said ball and an upper end projecting through said upper valve seat into engagement with the lower end of said armature, the length of said push rod being such as to hold said armature clear of said upper valve seat when said ball is seated against said lower end seat and to hold said ball clear of said lower valve seat when said armature is engaged with said upper valve seat, said ball being normally maintained seated against said lower valve seat by fluid pressure of said source connected to said port and said armature being movable into engagement with said upper valve seat in response to energization of said solenoid coil.

2. The invention defined in claim 1 wherein said valve body is of a ferro magnetic material and constitutes a pole piece of said solenoid coil.

* * * * *